United States Patent [19]

Dimitri et al.

[11] 4,287,104

[45] Sep. 1, 1981

[54] TACKIFYING COMPOSITION FOR RUBBER

[75] Inventors: Mitchell S. Dimitri, Charleston; Carlton G. Force, Mount Pleasant, both of S.C.

[73] Assignee: Westvaco Corporation, New York, N.Y.

[21] Appl. No.: 156,375

[22] Filed: Jun. 4, 1980

[51] Int. Cl.³ .................. C08L 7/00; C08L 9/00; C08L 21/00
[52] U.S. Cl. .................. 260/17.5; 106/123 TQ; 106/123 LC; 260/5; 260/758
[58] Field of Search .................. 260/5, 17.5, 758; 106/123 TQ, 123 LC

[56] References Cited

U.S. PATENT DOCUMENTS

| 1,217,157 | 2/1917 | Coughlin | 260/758 |
|---|---|---|---|
| 2,608,537 | 8/1952 | Pollak | 260/17.5 |
| 2,657,147 | 10/1953 | Van Valkenburgh | 106/123 TQ |
| 2,669,592 | 2/1954 | MacGregor et al. | 260/756 |
| 2,844,548 | 7/1958 | Maxo et al. | 260/17.5 |
| 3,163,614 | 12/1964 | Dimitri | 260/17.5 |
| 3,167,523 | 1/1965 | Dimitri | 260/17.5 |
| 3,247,135 | 4/1966 | Doughty | 260/17.5 |
| 3,312,643 | 4/1967 | Ball | 260/17.5 |
| 3,330,788 | 7/1967 | Montgomery | 260/17.5 |
| 3,474,059 | 10/1969 | Body | 260/27 |
| 3,632,855 | 1/1972 | Halbrook et al. | 260/468.5 |
| 3,649,580 | 3/1972 | Arlt et al. | 260/27 |
| 3,697,497 | 10/1972 | Falkehag | 260/124 A |
| 3,873,482 | 3/1975 | Severson et al. | 260/27 |
| 3,943,117 | 3/1976 | Force | 260/97.5 |
| 3,991,022 | 11/1976 | Dimitri | 260/17.5 |
| 4,016,119 | 4/1977 | Elmer | 260/17.5 |
| 4,025,711 | 5/1977 | Davidson et al. | 528/488 |
| 4,026,744 | 5/1977 | Elmer | 156/110 A |

OTHER PUBLICATIONS

Yureva et al., "Lignin-Tall Oil Mixture in a Formulation for Corcass Rubbers", Khim. Tekhnol. Ser., Kauch. Rezina, 1974, 2, 54-57.

*Primary Examiner*—Earl A. Nielsen
*Attorney, Agent, or Firm*—Richard L. Schmalz; Terry B. McDaniel

[57] ABSTRACT

Disclosed herein is a tackifying composition for rubber comprising an alkali lignin coprecipitated with a saponified tall oil pitch from an alkaline solution of the lignin and the pitch, the amount of saponified tall oil pitch being from 25% to 75% of the weight of said lignin. When the lignin-saponified pitch composite is added to a raw rubber stock in an amount of from 1 part to 50 parts per 100 parts of raw rubber stock the tack is improved.

11 Claims, No Drawings

TACKIFYING COMPOSITION FOR RUBBER

BACKGROUND OF THE INVENTION (1) Field of the Invention

This invention relates to a composition to be added to synthetic rubber to give the rubber improved tack. More particularly, this invention relates a tackifying composition for rubber which is a lignin-saponified tall oil pitch composite and to the process for making the composite.

(2) Description of the Prior Art

Styrene-butadiene (SBR) has a relatively low polarity compared to other synthetic rubbers; unlike natural rubber, SBR does not develop surface peroxidal activity upon mastication. Therefore, SBR has relatively poor inherent or processed tack. An adhesive is said to possess tack if, under the condition of application, only light pressure is required to produce a bond sufficiently strong to require work to restore the interface to its original separated state. Poor tack in SBR can be overcome by adding tackifiers, such as resins or natural rubber. The obvious drawback to using natural rubber, of course, is that any improvement realized is attained at the expense of using the very product which the polymer is intended to replace.

It has been known for several years that incorporation of small amounts of a copolymerizable unsaturated fatty acid monomer with styrene or styrene and butadiene improves the adhesive properties of the resulting polymer (i.e., Netherlands Application No. 6,411,493, Apr. 15, 1965—acrylic acid and fumaric acid and German Offenlegungschrift No. 2,437,365, Feb. 13, 1975,—itaconic).

The prior art includes many references to improving the properties of synthetic rubber by the incorporation therein of tall oil products. Four main products are usually obtained when refining crude tall oil distillation, namely, fore distillate (5-10%), tall oil fatty acids and a small amount of rosin-containing oils (30-35%), tall oil rosin (30-35%), and as a distillation residue, tall oil pitch (20-30%). Only the second and the third products are considered valuable raw materials and used by the chemical industry. In many distilleries at least the bulk of the fore distillate and the pitch is burned.

U.S. Pat. No. 2,657,147 to Van Valkenburgh discloses adding a mixture of tall oil acids and aniline to aid the compounding and vulcanization of rubber.

U.S. Pat. No. 3,474,059 to Body teaches that the adhesive properties of elastomeric olefin polymers can be improved by the incorporation therein of a small amount of tackifier additive comprised of at least two specific rosin-base materials.

In U.S. Pat. No. 3,649,580 to Arlt et al. the tack of an ethylene-propylene terpolymer rubber was improved by the addition of 1% to 20% tall oil pitch containing 80% to 100% non-volatile material as a 40° C. to 90° C. solution in rubber processing oil. Thus, dark brown tall oil pitch was distilled in a Pfaulder wiped film evaporator at 275° C. and 0.5-1.0 mm. of mercury pressure until all volatile material was removed to give a tackifier of specific hardness.

U.S. Pat. No. 3,873, 482 to Severson et al. discloses a process by which commercial tall oil materials, a mixture of fatty acids and resin acids, are pyrolized in a hot tube to yield products which when added to a synthetic rubber composition improve its tack U.S. Pat. No. 3,632,855 relates to a composition formed by the reaction of one mole of rosin acid with one mole of fatty olefin expoxide to give a hydroxy ester, useful as a tackifier in SBR rubber.

There have been processes proposed to improve the low quality, semifluid, tarlike, non-distillable tall oil pitch whereby it can be transformed into one or more products suitable for industrial applications.

For example, U.S. Pat. No. 3,926,936 discloses a process for manufacturing fatty acid and rosin, or a mixture of both, plus hard pitch of a new type from tall oil pitch.

U.S. Pat. No. 3,943,117 to C. G. Force relates to a process for saponifying tall oil pitch and for hydrolyzing the fatty acid esters found in a tall oil pitch fraction using small amounts of a cationic amine catalyst at specific conditions.

Finally, in 19 *Izv. Vyssh. Uchebn. Zaved., Lesn, Zh.,* 1976, 113-116 (Russ.) the optimum saponification conditions of tall oil pitch, which give the highest yield of phytosterol, were determined by simplex analysis.

Copending U.S. Patent Application Ser. No. 106,569 to Force discloses a styrene-butadiene copolymer rubber including a saponified tall oil pitch as a tackifier.

Lignin-rubber coprecipitates as ordinarily produced according to prior art techniques, generally have the nature of a paste or mud which is difficult to process to obtain a dry cake or crumb, thus requiring high temperatures or long drying times and the need to be filtered. The particles of the coprecipitate, due to their very small size, tend to fill the pores of any filter medium, resulting in very low filtration and washing rates. When filtered and washed, the particles do not possess much cohesiveness and yield a crumbly filter cake which is difficult to handle during subsequent drying operations. The particles in the filter cake are non-comprehensible and retain large quantities of water which cannot be expressed by mechanical means and must be removed by application of heat. In general, the solids content of coprecipitates will range from 24% to 35%.

Several methods for overcoming the disadvantages of coprecipitating lignin with rubber have been proposed. In U.S. Pat. No. 3,167,523, Dimitri disclosed a method to improve the processing of modified lignin-rubber coprecipitates by heating a slurry prior to filtration. U.S. Pat. No. 3,312,643 to Ball discloses another process for treating lignin-rubber coprecipitates which include mixing formaldehyde with a slurry of lignin-rubber particles, and heating to cause the lignin and formaldehyde to react. U.S. Pat. No. 3,697,497 to Falkehag discloses still another process wherein hexamethylene tetramine modifications of lignin are used to make a high melting, high surface area lignin by a relatively simple, straight forward reaction which includes spray drying. U.S. Pat. No. 3,991,022 to Dimitri discloses a process for making lignin reinforced polymers comprising coprecipitating hexamethylene tetramine modified alkali lignin and rubber or rubber latices with a gas.

Among the other patents which teach the addition of a lignin material to rubber includes U.S. Pat. No. 1,217,157, to Coughlin, which discloses a rubber composition containing sulfite waste liquor solids. Another patent is U.S. Pat. No. 4,025,711 to Davidson et al. which describes a process for the addition of a lignin compound to styrene-conjugated diolefin polymers.

The general object of the invention is to provide synthetic rubber compositions having improved tack.

Another object of this invention is to provide a composite for synthetic rubber which has improved tack which comprises an alkali lignin and saponified tall oil pitch.

Still another object of this invention is to provide a process for making the coprecipitated alkali lignin composites.

Other objects, features and advantages of this invention will become evident from the foregoing detailed description of the invention.

SUMMARY OF THE INVENTION

It has been found that synthetic rubbers have improved tack by the addition of a composite of an alkali lignin and saponified tall oil pitch in an amount of from 1 part to 50 parts of said composite per 100 parts of rubber, preferably from 3 to 10 parts of the composite per 100 parts of rubber. The composites are made by coprecipitating an alkali lignin slurried in an alkaline medium with a saponified tall oil pitch emulsified in an alkaline medium. The amount of the pitch may be from about 25% to about 75% of the weight of the lignin, preferably from about 40% to about 60%.

DETAILED DESCRIPTION OF THE INVENTION

The need for improved rubber tack is probably most apparent in the tire industry. Tires are typically constructed by applying layers of rubber-coated fabric one to another, followed by a breaker strip, cushion, and tread. The layers must possess sufficient surface tack to adhere firmly one to another and to maintain the desired relative position of the various parts prior to vulcanization. Absence of tack causes difficulty in the building operation. Thus, tack is an important property in the tirebuilding field. Failure of a tire body depends mainly either on unsatisfactory cohesive properties of the vulcanizate or insufficient adhesion of the layers and is due to hysteresis loss by frictional heat produced during use, causing stripping of the tread.

In tire building and recapping, tire tread compounds are essentially 100% synthetic rubber, most often styrene-butadiene (SBR), which is lacking in building, or "laying up," tack. Therefore, when the tread compound comes out of the extruder, a natural rubber cement is applied on the underside of the tread. Sidewall sections are treated in a similar manner. When the tread is wrapped around the carcass, cement is applied to keep the tread splice in place until the "green" tire is vulcanized. Use of cements of joining the layers reduces the dynamic bond strength of the plies. Improving the tack of SBR latex eliminates, or substantially reduces, the need for the relatively expensive natural rubber in tire building and recapping.

The lignins employed to make the composites of this invention are the type known as "alkali lignin" obtained from the black liquor formed during the manufacture of pulp by the sulfate or kraft process. The alkali lignins are insoluble in water, but soluble in alkali. It has also been found desirable to use an alkali lignin whose molecular weight has been increased by cross-linking with formaldehyde. Processes for such cross-linking are well known in the art and the cross-linked products are commercially available. The cross-linked lignins may be modified with up to 2 moles of formaldehyde, but preferred amount is from ½ to 1 mole of formaldehyde. The lignins may be modified by cross-linking with formaldehyde. Whereas alkali lignins are useful to make the composites of this invention, sulfonated alkali lignins or lignosulfonates (sulfite lignins) are not useful because of their water soluble nature.

The saponified tall oil pitch of this invention is the bottom fraction or pitch fraction of a crude tall oil distillation which has been at least partially saponified such that the product of the saponification has an acid number above the acid number of the starting material. Details for the production of the saponified tall oil pitch may be found in U.S. Pat. No. 3,943,117, to Force.

The tackifying composites of this invention are formed from the alkali lignin and saponified tall oil pitch in an amount of the pitch being present from about 25% to about 75% of the weight of the lignin, preferably the pitch being present in an amount from 40% to 60% of the weight of the alkali lignin.

The preferred method for making the composites of this invention is to slurry an alkali lignin or cross-linked alkali lignin in an alkaline aqueous medium. The pH of the alkaline medium may be adjusted to a pH between 10.5 and 12 with sodium hydroxide. The saponified tall oil pitch may be emulsified in an alkaline aqueous medium at a pH from 10 to 12. The lignin slurry and emulsified pitch are then intimately mixed to produce an emulsion. This emulsion is acidified to form a slurry of coprecipitated lignin-pitch particles. Conventional acidifying agents, such as hydrochloric acid, sulfuric acid, alum, zinc chloride, calcium chloride and magnesium chloride, may be used. In some instances it has been found desirable to heat coagulate the coprecipitated particles at a temperature between 150° F. and 225° F. prior to washing and drying. The lignin-rubber coprecipitated slurry may, if desired be washed to remove ash and other unwanted impurities. The coprecipitate is then dried by any conventional means, such as oven drying or spray drying.

Precipitation of lignin in the presence of the saponified tall oil pitch tends to produce loose flocs interspersed with the tall oil material. These lignin-tall oil agglomerates have sufficient compatibility with rubber to break up during milling and disperse in the rubber more readily than acid precipitated lignin alone.

The composites of this invention are compounded into raw rubber stock in amounts from 1 part to 50 parts of composite per 100 parts of raw rubber stock. The preferred addition is from 3 parts to 10 parts per 100 parts of raw rubber stock. The composite is blended with the raw rubber stock by any conventional means; such as a Brabender at 280° F.–350° F. for the required time, e.g., 30 minutes.

While using SBR, the styrene content will depend upon the particular application. For instance, SBR as employed in tire manufacturing and retreading contains from about 15% to about 40% styrene; and carboxylated SBR as employed in carpet manufacture contains from about 40% to about 65% styrene.

While the rubbers most frequently used with the lignin-pitch composites of this invention are SBR, other rubbers, such as, styrene-butadiene resin, polystyrene resin, butyl rubber, polysulfide rubber, polyvinyl chloride resin, polyvinyl acetate resin, acrylic resin and polyvinylidiene chloride resin, may also be used.

Also, depending upon the particular application, additional ingredients, such as antioxidants, extending oils, thickeners and water, may be employed without impairing the tack and adhesion properties of the SBR. Further, the inclusion of saponified tall oil does not detrimentally affect the other properties of the SBR, such as aging and water resistance.

While the discussion herein has related to tire building or recapping, those skilled in the art will appreciate that the compositions of this invention are useful in other rubber applications where improved tack is desirable.

The following examples serve to illustrate the invention.

EXAMPLE 1

A lignin-pitch composite was prepared by slurrying 661 grams of an alkali lignin (Indulin ®"B") in 6,000 ml. of water. The pH was adjusted to 11.0 with 94.3 grams of 50% sodium hydroxide. A saponified tall oil pitch made according to U.S. Pat. No. 3,943,117 was emulsified by adding 833 grams of pitch to 3,000 ml. of water containing 29.4 grams of 50% sodium hydroxide both at 75° C.

The lignin solution and split pitch emulsion were intimately mixed by blending together for 30 minutes in a Homomixer. This mixture was coprecipitated by adding 333 grams of alum to 2,000 ml. of hot water and the alum solution added to the mixed lignin-pitch with light agitation. The pH was 8.0. A second alum solution, like the first alum solution, was added with light stiring, lowering the pH to 4.0. The decrease in alkalinity caused coprecipitation of the lignin and pitch.

The coprecipitate was washed with hot water and spray dried in a Bowen Laboratory Model spray dryer at an inlet gas temperature of 550° F. and an exit temperature of 250° F. The composite was a light colored, free-flowing powder.

The resultant composite was blended with a styrene-butadiene raw rubber stock of 4 parts composite per 100 parts of SBR stock in a Brabender at 331° F. for 30 minutes. The rubber had a tensile strength of 2,250 p.s.i. and elongation 330%, tack of 56 p.s.i. and a stick of 34 p.s.i.

EXAMPLE 2

A lignin-pitch composite was made according to the process of Example 1 except the alkali lignin had been cross-linked with a half-mole of formaldehyde (Reax ® F. from Westvaco Corp.) and the coprecipitation was done with HCl to pH 1.9. The coprecipitate was heat coagulated at 200° F., filtered and washed with hot water. This material was re-slurried in water and spray dried at an inlet temperature of 205° C. and exit temperature of 100° C. This composite was blended into SBR stock and compared to Durex ® 13355, a commonly used phenolic rubber tackifier, both at 4 parts per 100 parts of rubber stock. The results are shown in the tables below.

procedures and examples, it is understood that the invention is not restricted to the particular material, combinations of materials, and procedures selected for that purpose. Numerous variations of such details can be employed, as will be appreciated by those skilled in the art.

What is claimed is:

1. A tackifying composition for rubber comprising an alkali lignin coprecipitated with a saponified tall oil pitch from an alkaline solution of the alkali lignin and the saponified tall oil pitch, the amount of the pitch being from about 25% to about 75% of the weight of the lignin.

2. The tackifying composition for rubber of claim 1 wherein the alkali lignin is cross-linked with up to 2 moles of formaldehyde.

3. The tackifying composition for rubber of claim 2 wherein the amount of the pitch is from about 40% to about 60% of the weight of the lignin.

4. A process for preparing a tackifying composition for rubber which comprises:
   (a) slurrying in an alkaline medium an alkali lignin,
   (b) emulsifying a saponified tall oil pitch in an alkaline medium,
   (c) intimately mixing the lignin slurry with the emulsified pitch to produce an emulsion,
   (d) acidifying the emulsion of step (c) with an acidifying agent to form a slurry of coprecipitated lignin-pitch particles, and
   (e) drying the coprecipitated lignin-pitch particles.

5. The process according to claim 4 wherein the coprecipitated lignin-pitch particles of step (d) are heat coagulated at a temperature between 150° F. and 225° F. prior to drying.

6. The process according to claim 5 wherein the amount of the pitch is from about 25% to about 75% of the weight of the lignin.

7. The process according to claim 6 wherein the amount of the pitch is from about 40% to about 60% of the weight of the lignin.

8. The process according to claim 5, 6 or 7 wherein the acidifying agent is from the group consisting of hydrochloric acid, sulfuric acid, alum, zinc chloride, calcium chloride and magnesium sulfate.

9. A rubber composition comprising a raw rubber stock and from 1 part to 50 parts by weight of the tackifying composition of claim 1 per 100 parts by weight of the rubber stock.

10. The rubber composition of claim 9 wherein the rubber stock is a member of the group consisting of styrene-butadiene rubber, styrene-butadiene resin, polystyrene resin, butyl rubber, polysulfide rubber, polyvi-

| Sample | Cure Min. at 293° F. | 200% Modulus psi | Tensile Strength psi | Elongation % | Set % | Resilience % | Tack psi | Stick psi |
| --- | --- | --- | --- | --- | --- | --- | --- | --- |
| 0.5M Reax ® F Composite | 30 | 1370 | 2170 | 320 | 6 | 49 | 56 | 34 |
| Durez ® 13355 | 45 | 1370 | 2110 | 310 | 9 | 48 | 51 | 38 |

The results show that the composite of this invention mixed with the rubber noticeably faster than the conventional tackifier. Also, for most applications, high tack and low stick to stainless steel are desirable.

While the invention has been described and illustrated herein by reference to various specific materials, nyl chloride resin, polyvinyl acetate resin, acrylic resin and polyvinylidiene chloride resin.

11. The rubber composition of claim 9 wherein the tackifying composition comprises from 3 parts to 10 parts per 100 parts by weight of the rubber.

* * * * *

UNITED STATES PATENT AND TRADEMARK OFFICE
CERTIFICATE OF CORRECTION

PATENT NO. : 4,287,104
DATED : September 1, 1981
INVENTOR(S) : Mitchell S. Dimitri and Carlton G. Force It is certified that error appears in the above-identified patent and that said Letters Patent are hereby corrected as shown below:

In column 1, line 18, "condition" should read --conditions--.

In column 1, line 68, after the word "tack" a --,-- should be inserted.

In column 2, line 39, "24%" should read --25%--.

In column 2, line 47, "include" should read --includes--.

In column 4, line 31, "lignin-rubber" should read --lignin-pitch--.

In Example 2, column 5, line 43, "F." should read --F,--.

Signed and Sealed this

First Day of December 1981

[SEAL]

Attest:

*Attesting Officer*

GERALD J. MOSSINGHOFF
*Commissioner of Patents and Trademarks*